Dec. 17, 1963    F. B. FOODY ETAL    3,114,209
LEVEL SENSOR
Filed April 27, 1960    2 Sheets-Sheet 1
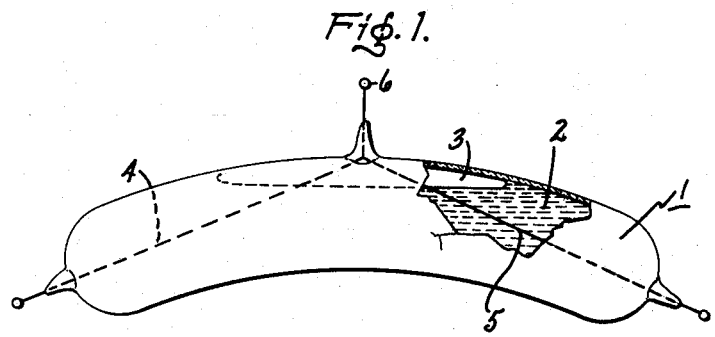
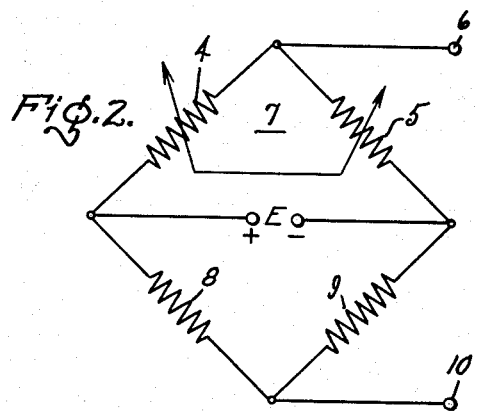
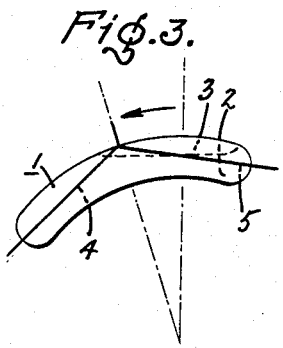
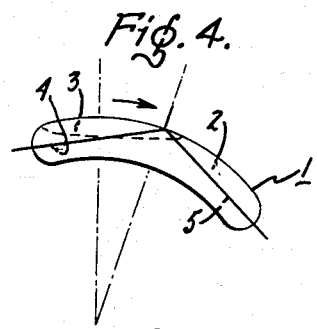
Inventors
Francis B. Foody
George F. Skala
by I. David Blumenfeld
Their Attorney Dec. 17, 1963

F. B. FOODY ETAL 3,114,209

LEVEL SENSOR

Filed April 27, 1960

Inventors
Francis B. Foody
George F. Skala
by J David Blumenfeld
Their Attorney

United States Patent Office
3,114,209
Patented Dec. 17, 1963

3,114,209
LEVEL SENSOR
Francis B. Foody, Ballston Spa, and George F. Skala, Scotia, N.Y., assignors to General Electric Company, a corporation of New York
Filed Apr. 27, 1960, Ser. No. 24,932
2 Claims. (Cl. 33—206)

This invention relates to a level sensing device and more particularly to a level sensing device which produces electrical output in response to any deviation from a predetermined reference level under the influence of forces such as gravity.

The need for a simple, accurate, and reliable level sensing and detecting device has long existed. Such devices are useful in systems for aligning radio telescopes and radar antennas, for example, in geophysical measurements, gyroscope systems, etc. Level sensing devices which are to be so used are commonly required to provide an electrical output as a function of the deviation from a predetermined or reference level. This electrical output may be utilized in an electro-mechanical control loop by providing an error or deviation signal to actuate a servo system which stabilizes these devices at the reference level. It is, therefore, necessary that the level sensing devices in such a system be very accurate, have a high level of sensitivity, and produce an output which is compatible with the over-all system into which it is to be incorporated.

Heretofore, available level sensing instruments have primarily been pendulous devices. An electrical pick-off is secured to an unbalanced mass such as a pendulum which is in turn secured to a supporting platform or frame which is displaced from the predetermined reference level under a gravitational force. The pick-off moves along a wire potentiometer resistance to produce an electrical output representative of the relative deviation of the frame and the pendulum. Pendulous devices of this type, though useful as level sensing elements, are quite large and complex structures and frequently require considerable associated circuitry and equipment. Hence, a great need exists for a level sensing device which is simpler in construction and smaller in size than the pendulous type.

Another prior art level sensing device which produces an electrical output which is a function of deviation from level is the so called electrolytic potentiometer level sensor. In a device of this sort, an arcuate glass tube is partially filled with an electrolytic fluid and a pair of electrodes are disposed within the fluid. As the glass tube is displaced from the reference level, a gas bubble in the tube is displaced varying the position of the electrolytic fluid, and hence, resistance in the respective electrode branches. While electrolytic sensing devices of this type are undisputedly satisfactory for many purposes, they do have shortcomings which limit their accuracy, stability, and sensitivity. Since the device is based on electrolytic principles, a chemically active liquid must be utilized which deteriorates with time, limiting the long term stability characteristics of the device. Electrolytic systems are also sensitive to the interface between electrolyte and electrode and because of the chemical activity of the fluid there is a probability of changing characteristics of this parameter with time.

In addition, gas is evolved by the electrolysis process generating internal pressures which may rupture the container and modify the nature and size of the gas bubble in such a manner that both the stability and the accuracy of the device are adversely affected. Another shortcoming of these electrolytic level sensing devices is that the electrolysis process itself generates electrolytic forces which act on the deviation sensitive bubble. Hence, the bubble is acted upon both by the gravitational force and the electrolytic force which, of course, introduces errors since the position of the bubble is affected by parameter other than the parameter to be measured, i.e., gravity as a representation of displacement from the reference level. To overcome the shortcomings of these prior art devices is the purpose of this invention.

It is a primary object of this invention, therefore, to provide a level sensing device of high reliability, high accuracy, a good long and short term stability, and which requires a minimum of external equipment for its application.

A further object of this invention is to provide a thermal conductivity based level sensing device.

Another object of this invention is to provide a hot wire level sensing device.

Still another object of this invention is to utilize a level sensing device of the bubble type which utilizes an electrically nonconducting liquid.

Other objects and advantages of the instant invention will become apparent as the description thereof proceeds.

The foregoing objects and advantages are realized by positioning a temperature sensitive resistance element in a fluid filled bubble level. As the bubble is displaced in response to deviations from the level, the amount of the element immersed in the fluid varies as does the heat dissipated by it. The temperature of the resistance element, therefore, varies with deviation from the reference level as does the resistance. The element is connected in a bridge arrangement so that changes in resistance due to deviation from level change the bridge conditions, producing an electrical output signal the magnitude of which is a function of the amount of deviation and its direction.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which;

FIGURE 1 is a partially broken away plan view of a level sensing device;

FIGURE 2 is a schematic illustration of a bridge arrangement incorporating the level sensing device of FIGURE 1;

FIGURES 3 and 4 are vertical sections through the level sensing device shown in tilted positions;

Figure 6:
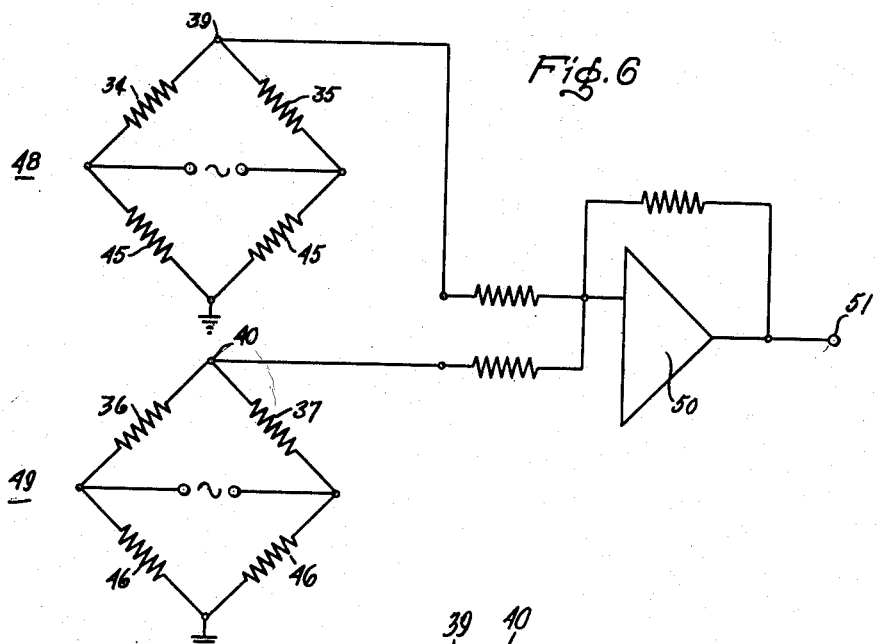
FIGURE 6 is a schematic illustration of a circuit incorporating the two-axis level sensing device of FIGURE 5.

Referring now to FIGURE 1, the level sensing device embodying the principles of the invention consists of a hollow body 1, usually of glass, which is partially filled with a heat dissipating liquid 2, the remaining space being occupied by a deviation sensitive bubble 3 of inert gas. The liquid has good thermal conductivity, is electrically nonconducting; i.e., a nonpolar fluid, and preferably also has a low freezing point, low viscosity, and a relatively low coefficient of expansion. One liquid which fulfills substantially all of these requirements and is suitable for use in the level sensing device is ethyl alcohol. Alternatively, kerosene may also be utilized as the fluid in the curved body 1 as it also fulfills substantially all of the requirements enumerated above.

Two temperature sensitive resistance wire elements 4 and 5 extend into the interior of the body and are partially immersed in the liquid. The wire resistance elements are joined at one end near the center of the body and project through the curved wall to form a common output terminal 6. The remaining ends of wires 4 and 5 are brought out of the body 1 at opposite ends thereof for connection to suitable electric circuitry, presently to be described.

Resistance wires 4 and 5 should have a high temperature coefficient of resistance, high tensile strength, high resistance per foot per mil diameter of wire, and should be highly stable and have suitable wetting properties. Typically, the wires 4 and 5 may be fabricated of such materials as Nichrome, tungsten, or platinum, which have all of the enumerated desirable properties and particularly a high positive temperature coefficient of resistance. It will be appreciated, of course, that materials having negative temperature coefficients of resistance, such as carbon and various semiconductor thermistor materials, may also be utilized without departing from the spirit of the invention.

As may be seen in FIGURE 2, the resistance wires 4 and 5 are connected as adjacent arms of a Wheatstone bridge circuit indicated generally at 7. Two fixed resistors 8 and 9 are connected as the remaining arms of the bridge and a bridge energizing voltage is impressed between the junction of resistances 4 and 8 and the junction of resistances 5 and 9. If the energizing voltage is unidirectional (i.e., D.C.) the output voltage appearing across the output terminals 6 and 10 varies in amplitude and polarity with the magnitude and direction of the deviation from level. If the bridge is energized from an alternating source, on the other hand, the output varies in amplitude and phase as the level sensing device deviates from a predetermined level.

In operation, when the switch is in its normal or level position as shown in FIGURE 1, equal lengths of wires 4 and 5 are immersed in liquid 2 and equal amounts project into the bubble of inert gas 3 so that with the bridge energized, equal currents flow through the wires. The conduction heat loss from each wire to the liquid 2 is, therefore, the same and their temperatures and resistances are also equal and the bridge 7 of FIGURE 2 is balanced and the output voltage across the terminals 6 and 10 is zero. When the switch is tilted to the left as shown in FIGURE 3 the bubble 3 moves toward the right hand end of the curved body so that less of the wire 4 and more of the wire 5 projects into the bubble. Liquid 2 covers more of wire 4 and less of wire 5 so that more heat is conducted away from wire 4 due to the high thermal conductivity of the liquid. The temperature of wire 4 drops while less heat is conducted away from wire 5 than previously because of the lower heat conductivity of the gas bubble. As a result, and assuming a positive temperature coefficient of resistance, the resistance of the wire element 4 decreases and that of wire 5 increases causing the bridge to become unbalanced. With resistance of wire 5 larger than the resistance of wire 4 terminal 6 is more positive than terminal 10 by an amount which is a function of the magnitude of the deviation from level and the polarity of which is determined by the direction of the deviation from the predetermined level.

When the switch is tilted in the opposite direction, as illustrated in FIGURE 4, bubble 3 moves towards the left end of the body and exposes more of the wire 4 and less of the wire 5. More heat is conducted away from wire 5 to the liquid and its temperature drops correspondingly while the opposite effect takes place with wire 4 so that its temperature rises. As a result the resistance of wire 5 is reduced and that of wire 4 rises, again unbalancing bridge 7 but in an opposite direction so that the polarity of signal appearing at the output terminals 6 and 10 reverses. It can be seen therefore that the novel level sensing arrangement of the instant invention provides an additional advantage in that a differential resistance effect is obtained with deviation from the level. That is, as the bubble 3 moves with deviations from the predetermined level, the resistance of one element goes up while the resistance of the remaining wire element goes down correspondingly thus producing an enhanced unbalancing effect upon the bridge circuit so that even very minute deviations from the desired level produce an output from the bridge. As a result, the instant level sensing device is extremely sensitive and produces an indication of deviations from the level in the order of seconds of arc.

The output voltage at terminals 6 and 10 of bridge 7 may be directly connected to an indicating device such as a meter to provide a measure of the deviation and the meter calibrated directly in seconds of arc or other angular terms. The output at the terminals may also be utilized in a servo loop to drive a balancing motor, not shown, which controls the positioning and level of the elements supporting the level sensing device. Thus as an output appears across these terminals the servo motor is energized to operate in a direction to restore the switch to balance. As the balancing motor, not shown, is driven by the output from bridge 7 and the sensing device returns toward the desired level, the magnitude of the output signal decreases slowly as the resistances of the two wire elements 4 and 5 vary until the desired reference level is again achieved and the inert gas bubble 3 is centered so that the resistance wires 4 and 5 are equally immersed in the liquid.

Figure 5:
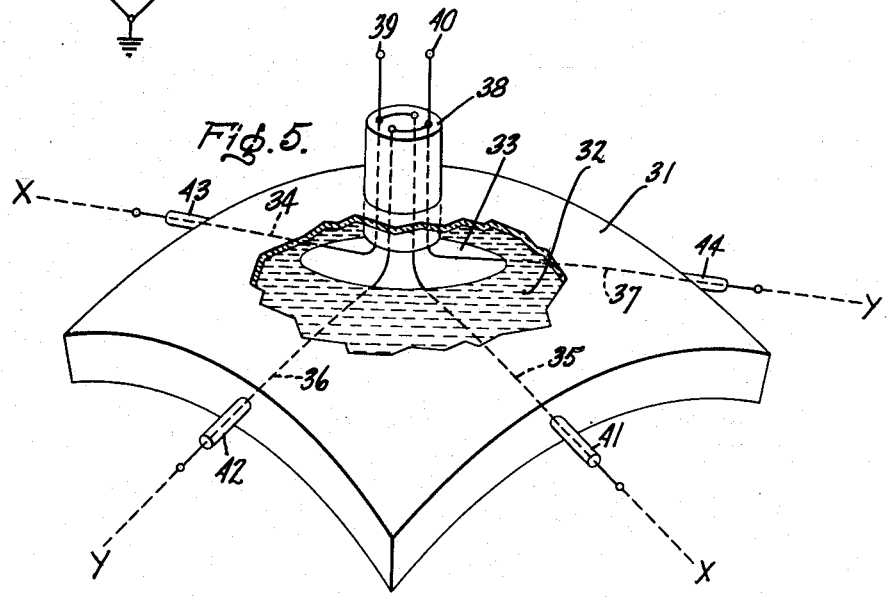
FIGURE 5 is a perspective drawing of a two-axis level sensing device.

The level sensing device of FIGURE 1 and the two thermally sensitive resistance wires forming a part thereof are so oriented that the device is sensitive along one axis. It is also possible to construct a level sensing device in accordance with the invention which is sensitive to angular changes or deviations along two mutually perpendicular axes. FIGURE 5 illustrates, in perspective, a level sensing device which is sensitive along two axes. The level sensing device consists of a hollow body 31, preferably of glass, which is shaped as a portion of a spherical surface and is filled with an electrically non-conducting liquid 32 such as ethyl alcohol or kerosene for example. In a manner similar to the construction of FIGURE 1, the body 31 is only partially filled with the liquid so that a gas bubble 33, preferably of inert gas, occupies space near the upper surface of the body 31. Positioned within the hollow body 31 and partially immersed in the fluid 32 are four thermally sensitive resistance wires 34, 35, 36, and 37 connected as two mutually perpendicular resistance wire pairs 34—35 and 36—37. The wire pairs 34—35 and 36—37 are brought out of the hollow body 31 through an insulating plug 38 and are connected to form two independent output terminals 39 and 40. The other ends of the individual resistance wires extend through the sides of the hollow body at the electrode terminals 41, 42, 43 and 44 and are adapted to be connected in individual Wheatstone bridge circuit arrangement presently to be described. As may be seen from observation, if this two-axis switch is tilted to deviate from the axis x—x shown in FIGURE 5, the gas bubble 33 is displaced to the right or the left and more or less of the resistance wires 34 and 35 are immersed in the fluid and in the manner described previously changes the resistance thereof. If the level sensing device on the other hand is tilted along the axis y—y the bubble 33 is displaced to immerse more or less of the wire resistance 36 and 37 and correspondingly varying their resistance. Any complex motion which simultaneously deviates from the x—x and y—y axes causes the bubble to move along both axes and the level sensing device of FIGURE 5 produces two independent electrical outputs which are representative of the deviation from the two axes of sensitivity. The wires are connected in suitable bridge circuits and the output signals are connected to individual servo loops for rebalancing the support platform on which the level sensing device is mounted.

On the other hand, the output from the two-axis sensing device illustrated in FIGURE 5 may be utilized in such a manner as to produce an output signal which represents the attitude of the sensing device for very small deviation angles. That is the attitude of any device is defined by the angles made by the axes of the device or the platform supporting the device relative to a reference plane or level. Since the output signals from the level sensing device represents the angles or deviations from two mutually perpendicular axes, the vector sum of these two deviations represent the attitude of the device with respect to the reference plane.

FIGURE 6 illustrates a circuit arrangement for combining the two output signals from the level sensing device in such a manner that a signal representing their vector sum is produced at the output of the circuit. Thus in FIGURE 6 two Wheatstone bridge arrangements 48 and 49 respectively, are provided each of which includes one wire pair as two arms thereof. Thus resistance wire elements 34 and 35 are connected as two adjacent arms of bridge 48 and a pair of fixed resistances 45 are connected in the remaining arms. The junction of the resistance wire elements 34 and 35 comprises the output terminal of the bridge whereas the junction of the resistance 45 is connected to a source of reference potential such as ground. In a similar fashion wire resistance element 36 and 37 are connected as two adjacent arms of bridge 49 and a pair of fixed resistances 46 as the remaining arms of the bridge.

The bridges 48 and 49 have quadrature alternating voltages impressed across their respective terminal pairs 42—44 and 41—43. Thus the bridge 48 has impressed thereon an alternating voltage which is represented by the equation $$e = e_0 \sin \omega t \quad (1)$$

and bridge 49 is energized by a quadrature voltage $$e = e_0 \sin (\omega t + 90°) \quad (2)$$

The electrical outputs from the individual bridges 48 and 49 at output terminals 39 and 40 are therefore always in quadrature and are the vectorial representation of the deviation of the sensing device along the mutually perpendicular axes of sensitivity. The output signals are combined vectorially in summing amplifier 50 to provide at the output terminal 51 thereof a signal which is the vectorial sum of the signals representing the deviation along the two axes and hence a representation of the attitude of sensing device or its supporting platform with respect to a reference plane. It will be understood by those skilled in the art that the vectorial addition performed by the summing amplifier 50 may be carried out by other circuitry and that the summing amplifier 50 is shown by the way of example only and is not to be considered as being limiting.

While particular embodiments of this invention have been shown it will, of course, be understood that it is not limited thereto since many modifications both in the circuit arrangement and in the instrumentalities employed may be made. It is contemplated by the appended claims to cover any such modifications which fall within the true spirit and scope of this invention.

What we claim as new and desire to secure by Letters Patent of the United States is:

1. In a level sensing device the combination of a semi-spherically curved housing partially filled with a thermally conducting liquid and partially filled with a gas bubble, a first thermally sensitive current carrying physically straight resistance wire having its end portions partially immersed in said liquid and having its midportion disposed in said gas bubble in the level position, a second thermally sensitive current carrying linear resistance wire having its end portions partially immersed in said liquid and the midportion thereof disposed in the gas bubble in the level position and disposed at right angles to said first resistance means, the semi-spherically curved housing being open in the spaces between the first and second wires in order that the thermally conductive liquid be free to move within this space to vary the immersion of the wires, the amount of immersion of said first and second resistance wires varying with deviation of said device from the reference level position along two mutually perpendicular axes whereby the temperatures and resistances of said resistance means varies proportionally with deviation along said axes.

2. In a circuit for producing an electrical output representing attitude, the combination comprising a semi-spherical housing partially filled with a thermally conducting liquid and partially filled with a gas bubble, a plurality of pairs of thermally sensitive physically straight resistance wires partially immersed in said liquid and partially disposed in the gas bubble at the reference level position, said pairs of resistance wires being transversely disposed at right angles to each other, and said semi-spherical housing being open in the spaces between the pairs of transversely disposed wires in order that the thermally conductive liquid be free to move within this space whereby deviation of said housing along mutually perpendicular axes from the reference level position varies the degree of immersion and resistance of said resistance means proportionally, a plurality of bridge means having said resistance means connected therein, said bridge means being energized in quadrature phase whereby the outputs from said bridges are in quadrature phase and represent the deviation of said housing along the mutually perpendicular axes, and summing means to add said outputs vectorially and produce a resultant output representative of the attitude of said housing.

References Cited in the file of this patent
UNITED STATES PATENTS

| | | |
|---|---|---|
| 1,317,072 | Carlier | Sept. 23, 1919 |
| 2,338,811 | Hasbrook | Apr. 11, 1941 |
| 2,456,619 | Curry et al. | Dec. 21, 1948 |
| 2,713,726 | Dixon | July 26, 1955 |
| 2,947,175 | King et al. | Aug. 2, 1960 |